US006042003A

United States Patent [19]

Bigge et al.

[11] Patent Number: 6,042,003

[45] Date of Patent: Mar. 28, 2000

[54] LIGHTING SYSTEM FOR AUTOMATED BANKING MACHINE

[75] Inventors: William J. Bigge; Joseph F. Gagliardi, III, both of North Canton, Ohio

[73] Assignee: Diebold, Incorporated, North Canton, Ohio

[21] Appl. No.: 09/115,957

[22] Filed: Jul. 15, 1998

Related U.S. Application Data

[60] Provisional application No. 60/067,317, Nov. 28, 1997.

[51] Int. Cl.[7] .................................................... G06F 17/60

[52] U.S. Cl. ......................... 235/379; 235/380; 235/381; 902/30

[58] Field of Search .................................... 235/379, 381, 235/380, 382; 902/30, 32, 33, 35

[56] References Cited

U.S. PATENT DOCUMENTS 3,962,702 6/1976 Kriege .
4,179,723 12/1979 Spencer ................................ 902/30 X
4,321,672 3/1982 Braun et al. ........................ 235/379 X
5,097,396 3/1992 Myers ...................................... 362/32
5,202,549 4/1993 Decker et al. ......................... 235/379

*Primary Examiner*—Michael G Lee
*Attorney, Agent, or Firm*—Ralph E. Jocke

[57] ABSTRACT

An automated banking machine includes a light source (42) for selectively illuminating either a fascia (36) or an interior area (20) of an enclosure (10). The light source is movably mounted on brackets (54) so as to be movable into a light conducting passage (46) which conducts light to illuminate the fascia. When the interior area of the enclosure is to be illuminated the light source is moved relative to the brackets to be positioned outside the light conducting passage. Service of serviceable components (22, 24, 26) is facilitated by using the light source to illuminate the interior area of the enclosure.

20 Claims, 11 Drawing Sheets

LIGHTING SYSTEM FOR AUTOMATED BANKING MACHINE

Provisional application No. 60/067,317 filed Nov. 28, 1997.

TECHNICAL FIELD

This invention relates to automated banking machines. Specifically this invention relates to a lighting system for an automated banking machine which enables selectively illuminating either a fascia of the machine or an interior area where serviceable components are located.

BACKGROUND ART

Automated banking machines are known in the prior art. A common type of automated banking machine is an automated teller machine (ATM). ATMs may be used to conduct banking transactions. Such transactions include dispensing cash, making deposits and transferring funds between accounts.

Automated banking machines include many different types of components. These components are housed within an enclosure. The components may be accessed by authorized personnel. Periodically the components in the enclosure must be serviced. Sometimes there is insufficient light within the enclosure to perform the service activities. In these conditions the service provider is required to use a flashlight or other portable light source to conduct their work.

Some automated banking machines are installed through a wall for use by customers outside of a building. Such machines are often used in drive-up and walk-up applications. Such machines include a fascia which is accessible by a customer outside the building. The fascia includes a display and user actuatable components which customers use or manipulate during operation of the machine. Such user actuatable components may include a card slot for inserting a credit or debit card. A receipt slot is used to deliver receipts. Other user actuatable components include a keypad and function buttons. A currency receipt mechanism and a deposit accepting mechanism are also commonly included among the user actuatable components on the fascia of an ATM.

During evening hours there is often insufficient light for users to adequately see the user actuatable components. To facilitate operation at night, operators of ATMs have often provided external light sources to illuminate the fascia.

In recent years ATM machines have been developed which have improved customer interface areas which are easier to operate. These new machines generally have more features and enable customers to conduct more types of transactions than older machines. Occasionally older machines are replaced with new machines. When an older drive-up or walk-up machine is replaced there may be a need to make significant modifications to the building wall through which the prior machine has been installed. This is because new machines which provide added functionality often have larger fascias to accommodate the enhanced customer interfaces which are required to conduct additional transactions. Changing the access opening in the wall to accommodate a new machine may be an expensive proposition. This is particularly true where the facility in which the machine is installed has thick walls made of brick or other materials which are not readily changeable. The facility in which the machine is installed may have historical significance or be subject to restrictions against modifications, which complicates making any changes.

Thus there exists a need for an automated banking machine apparatus which provides a light source for both serviceable components in an interior area of an enclosure as well as for the fascia of the ATM. There further exists a need for an ATM that provides an enhanced user interface, but which can be installed in a relatively smaller wall opening.

DISCLOSURE OF INVENTION

It is an object of the present invention to provide an automated banking machine.

It is a further object of the present invention to provide an automated banking machine that includes a lighting system for illuminating serviceable components in an interior area of an enclosure.

It is a further object of the present invention to provide an automated banking machine which includes a lighting system that provides a light source for selectively illuminating a fascia of the machine.

It is a further object of the present invention to provide an automated banking machine which includes a lighting system that may be used to selectively illuminate either the interior area of an enclosure or a fascia.

It is a further object of the present invention to provide an automated banking machine that provides an enhanced user interface in a relatively smaller area.

It is a further object of the present invention to provide an automated banking machine which provides an enhanced user interface which can be installed in an opening in a building wall sized for older machines.

It is a further object of the present invention to provide a method for selectively illuminating either an interior area of an enclosure of an automated banking machine or a fascia of the machine.

Further objects of the present invention will be made apparent in the following Best Modes for Carrying Out Invention and the appended claims.

The foregoing objects are accomplished in a preferred embodiment by an automated banking machine. The machine includes an enclosure with an interior area. The interior area houses serviceable components of the machine.

The machine further includes a fascia. The fascia includes user operable components which are accessed and/or actuated by users in operation of the machine.

The machine further includes a light source movably mounted in the enclosure. The light source is movable between a first position in which it illuminates the fascia. In this first position the light source is positioned in a light conducting passage which conducts light to illuminate the fascia. This enables customers to operate the user actuatable components in low ambient light. The light source is movable from the first position to a second position. In the second position the light source illuminates the interior area of the enclosure. This provides light for a service provider servicing components of the machine.

BEST MODES FOR CARRYING OUT INVENTION

Figure 1:
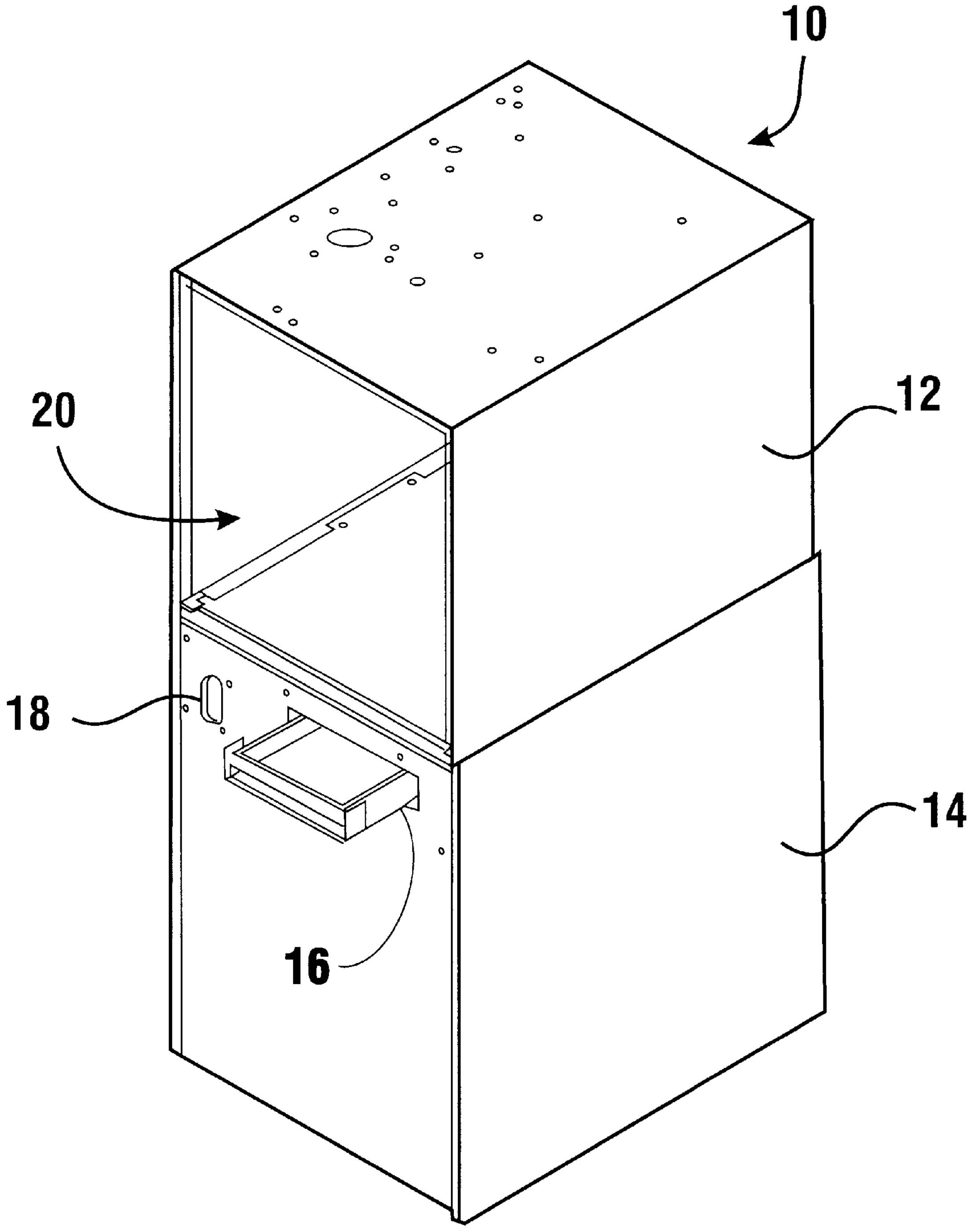
FIG. 1 is an isometric view of a housing of an automated banking machine.

Referring now to the drawings and particularly to FIG. 1 there is shown therein an enclosure for an automated banking machine generally indicated 10. The enclosure includes an upper housing 12 and a chest 14. Chest 14 is preferably a secure chest which houses critical components and valuable documents which are dispensed or received by the automated banking machine. Chest 14 has an opening 16 for a mechanism used for dispensing documents. Chest 14 also has an opening 18 for mounting other components. It should be understood that additional openings and devices may be provided in the enclosure, such as for receiving or dispensing documents, passbooks, tickets, vouchers, or other items. For purposes of this invention it should be understood that the term automated banking machine encompasses any type of apparatus that can be used to carry out transactions which include the transfer of value from one entity to another.

Figure 2:
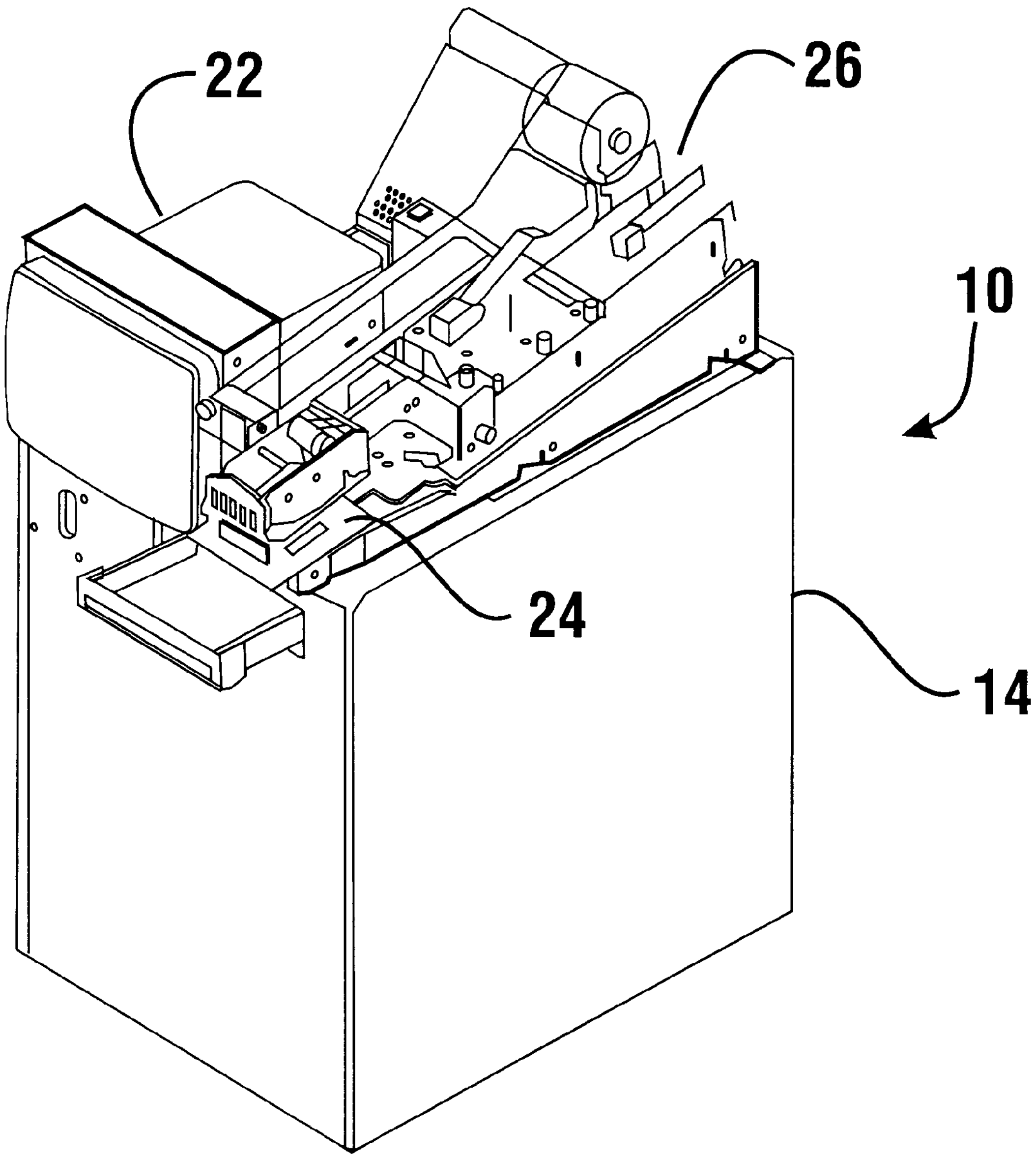
FIG. 2 is an isometric view of the lower portion of the housing and serviceable components of the machine which are housed in an upper portion of the housing.

Upper housing 12 includes an interior area 20. It should be understood that chest 14 includes an interior area as well. As shown in FIG. 2 interior area 20 includes various components of the automated banking machine. These components include a display 22, a card reader 24 and printing devices 26. Some of the components housed in the interior area of the enclosure are devices that occasionally require servicing. It should be understood that the devices mentioned are exemplary and that certain devices need not be included in a particular automated banking machine of the invention. Conversely automated banking machines of the invention may include numerous other types of devices and components.

Figure 3:
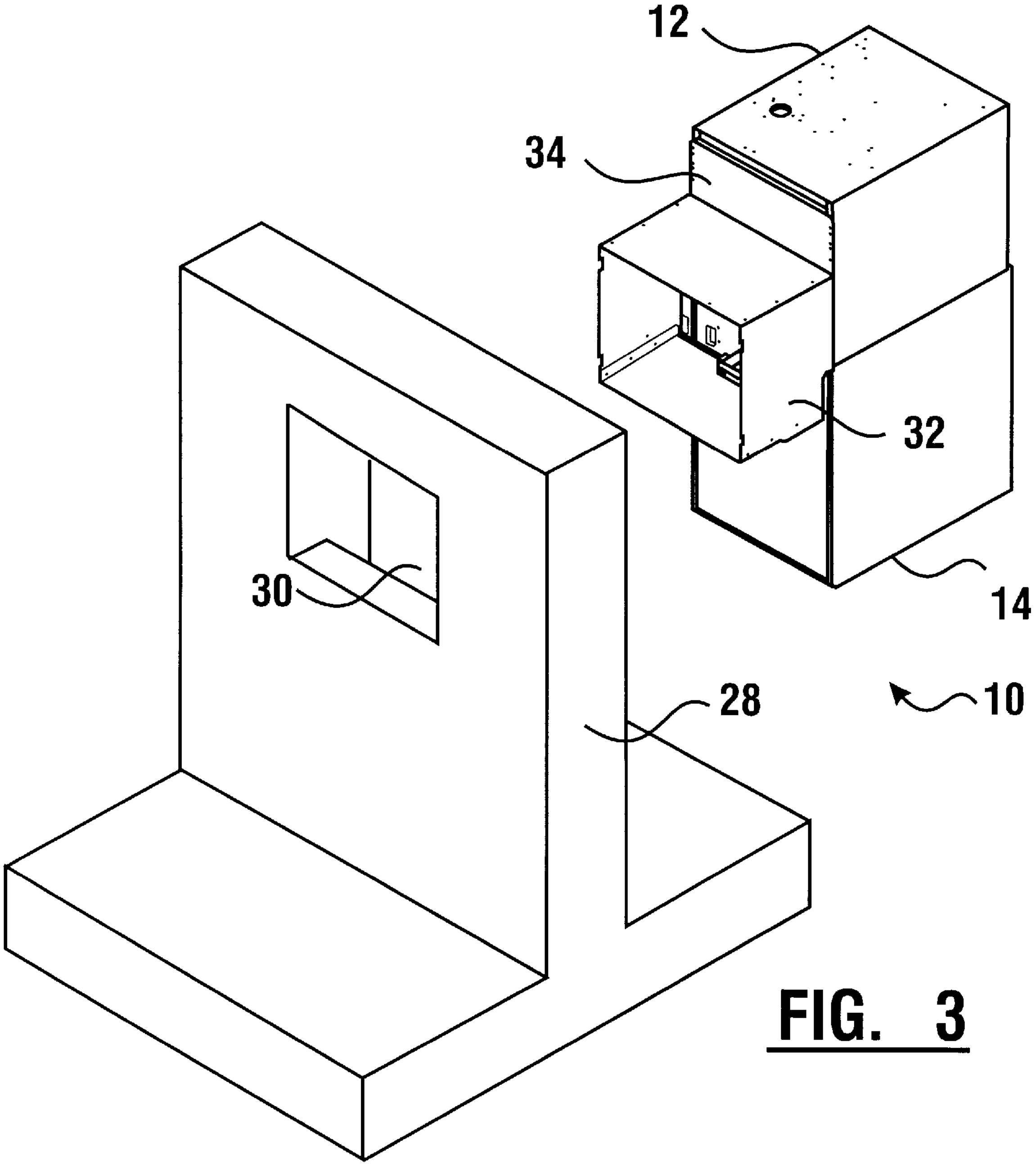
FIG. 3 is an isometric view of the housing of the automated banking machine with a housing extension mounted thereon, and a building wall including an opening for accepting the housing extension.

As shown in FIG. 3 the automated banking machine which includes enclosure 10 is designed for a "through the wall" installation. FIG. 3 shows schematically a building wall 28. Building wall 28 is representative of an exterior wall of a bank or other institution which installs automated banking machines so as to make them accessible to users positioned outside of the building. Wall 28 includes an opening 30. Wall opening 30 in the embodiment shown is a relatively small opening used in connection with prior art type automated banking machines.

As shown in FIG. 3 enclosure 10 is configured for purposes of installation in opening 30. Enclosure 10 has thereon a housing extension 32. Housing extension 32 is preferably a rectangular enclosure which extends forward from the housing. An upper panel 34 closes the front opening of housing 12 above housing extension 32.

Figure 4:
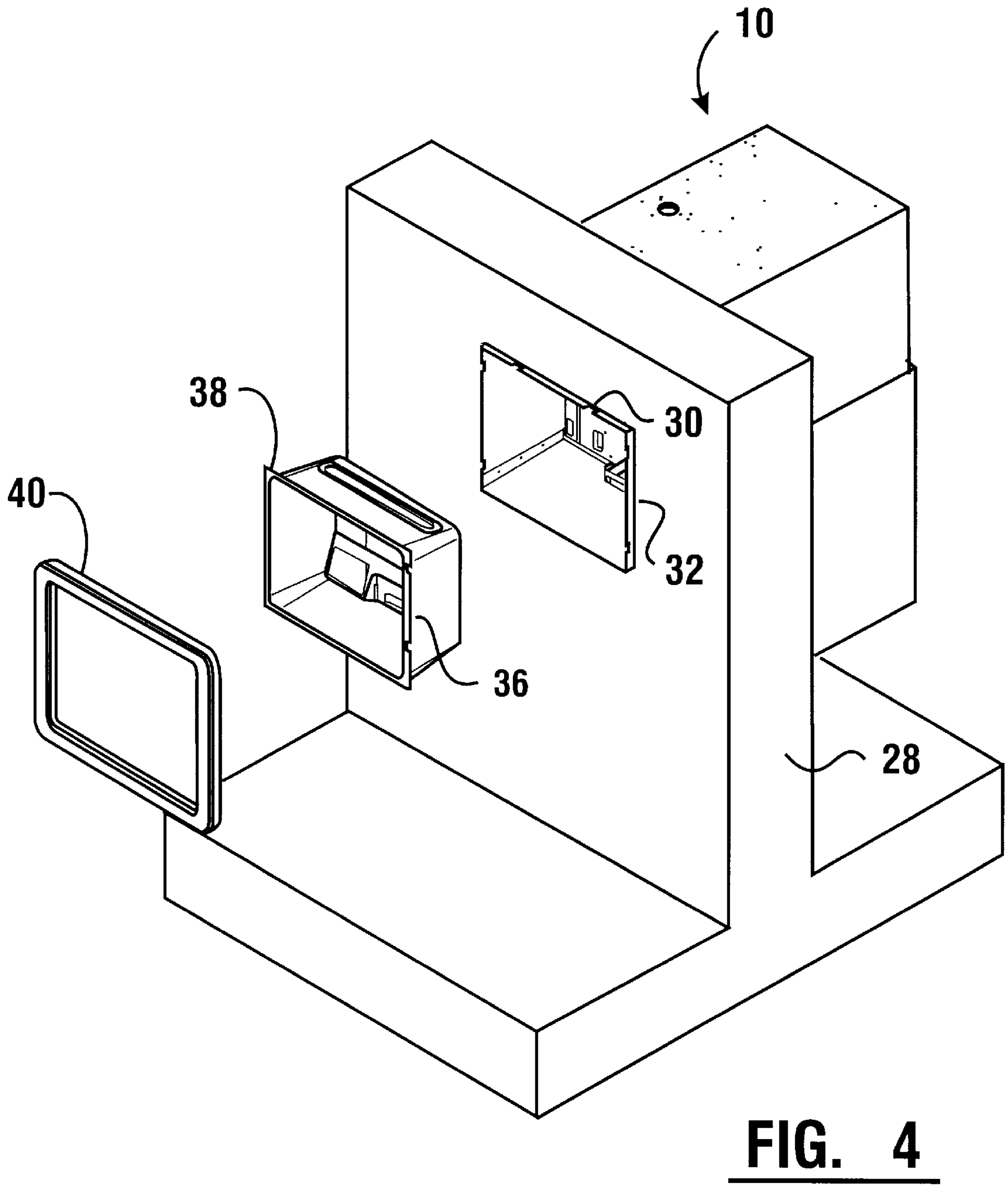
FIG. 4 is an isometric exploded view of the automated banking machine positioned in the wall opening, a fascia and a fascia ring.

As shown in FIG. 4 housing extension 32 is sized for acceptance in wall opening 30 in close fitting conforming relation. A fascia 36 is accepted into the interior of housing extension 32. Fascia 36 includes openings thereon for enabling a user to view the display and to deliver and receive documents from the mechanisms in the machine enclosure. Fascia 36 also provides access to other user actuatable components. Such user actuatable components may include a keypad, card slot, receipt opening, function buttons and other things that a user may use or actuate in the operation of the ATM.

The fascia is preferably attached to the housing extension 32 by fasteners or other releasible attaching means. A flange 38 which extends about the perimeter of the fascia 36 serves to hold the housing extension engaged with the wall 28. A fascia ring 40 is mounted in overlying relation with the perimeter of the fascia in the flange 38. Fascia ring 40 serves to prevent unauthorized access to the fasteners which hold the fascia to the housing extension.

A novel aspect of the preferred embodiment of the present invention is that interior area 20 has a light source 42 mounted therein. Light source 42 in the preferred embodiment is an elongated tube. The light source is movable in a manner later discussed between positions in which it illuminates the fascia 36 or illuminates interior area 20.

Figure 5:
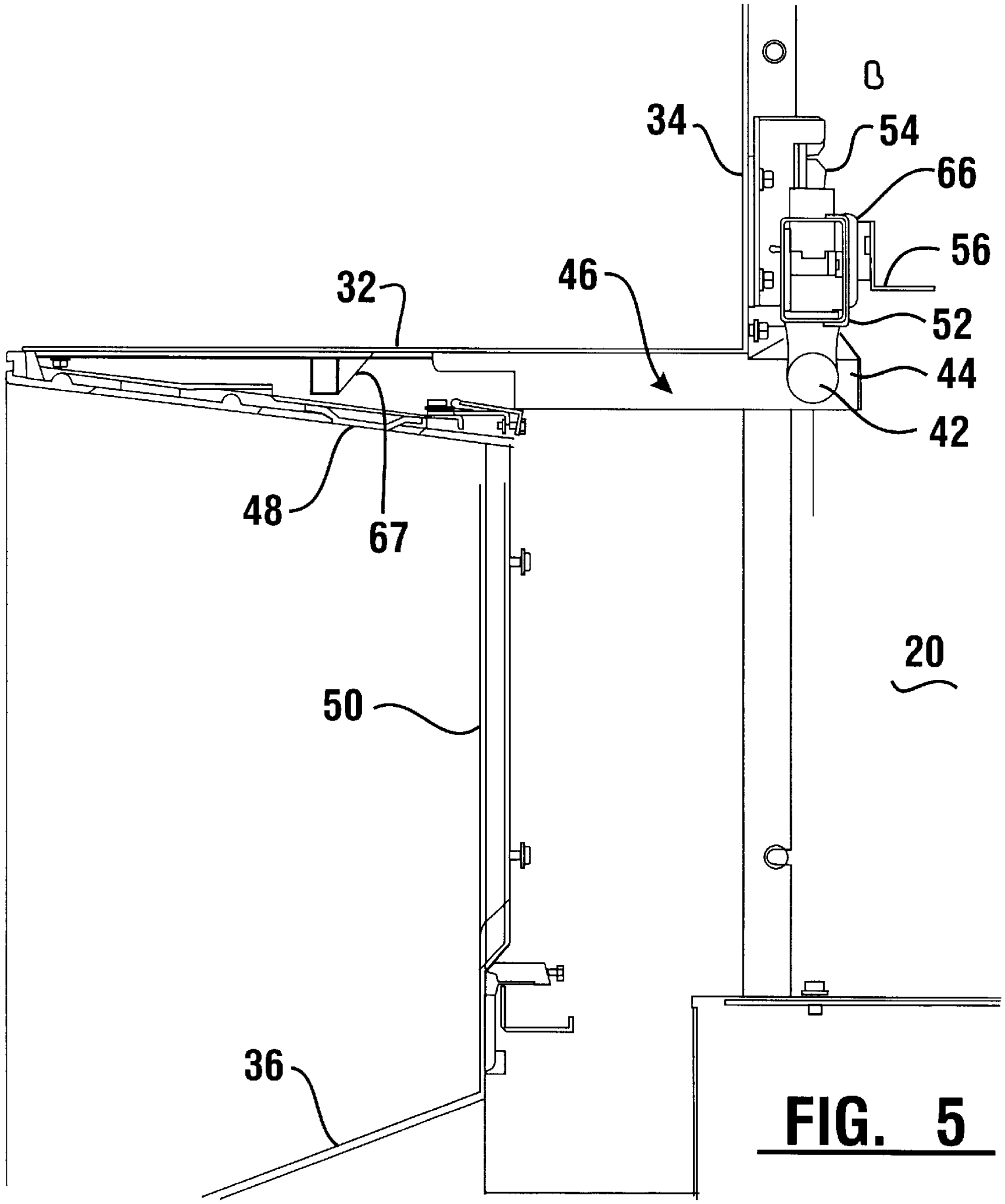
FIG. 5 is a left hand cross-sectional view of a light source positioned in the enclosure in a light conducting passage.

As shown in FIG. 5 light source 42 may be positioned in a pocket 44 of a light conducting passage 46. Light conducting passage 46 in the preferred embodiment is an opening generally about as wide as light source 42 which conducts light from the light source to illuminate the fascia. Light conducting passage 46 preferably has walls of highly reflectorized material. The contour of the light conducting passage directs light through a translucent lens 48 on the fascia 36. Light transmitted through lens 48 falls on the user actuatable components which are generally positioned in the area of face 50 in FIG. 5. Light source 42 provides sufficient illumination when it is positioned in the light conducting passage to illuminate the fascia in low ambient light conditions.

Light source 42 is connected to electrical contacts mounted on a body 52. Body 52 is movably supported by a pair of horizontally spaced mounting brackets 54 (see FIG. 6). In the preferred embodiment brackets 54 are formed on a unitary frame, but may be separate pieces in other embodiments. A handle 56 attached to body 52 facilitates moving the light source in a manner which will be discussed.

Figure 6:
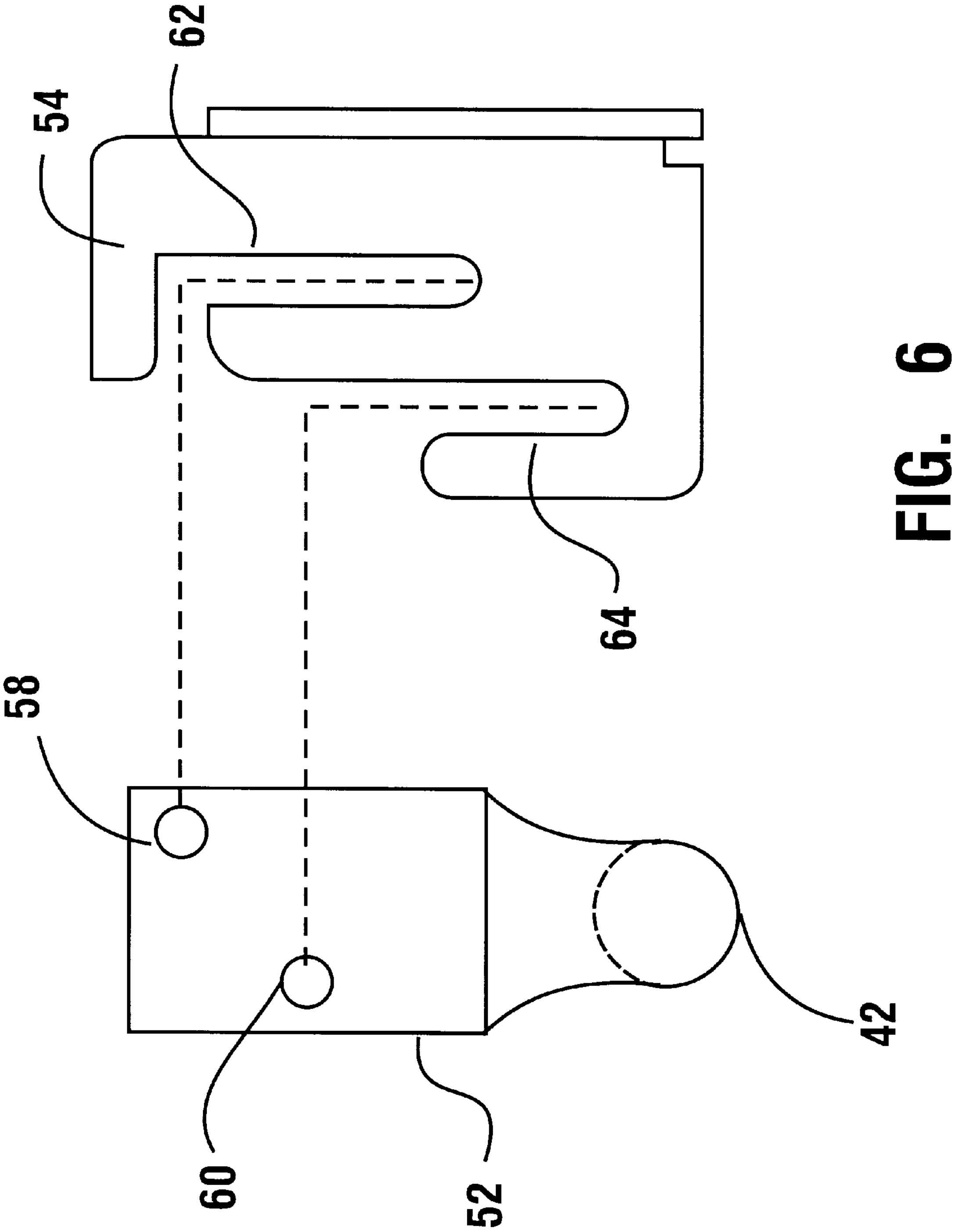
FIG. 6 is a left side view of the light source and a mounting bracket for supporting the light source.

As shown in FIG. 6 body 52 includes at each end a front projection 58 and a back projection 60. Projections 58 and 60 extend outward from body 52 and are sized for acceptance in slots in the mounting brackets. Front projection 58 is sized for acceptance in an L-shaped slot 62. Back projection 60 is accepted in a shorter vertically extending slot 64. The acceptance of the projections in the slots is indicated by the dotted lines in FIG. 6.

Figure 7:
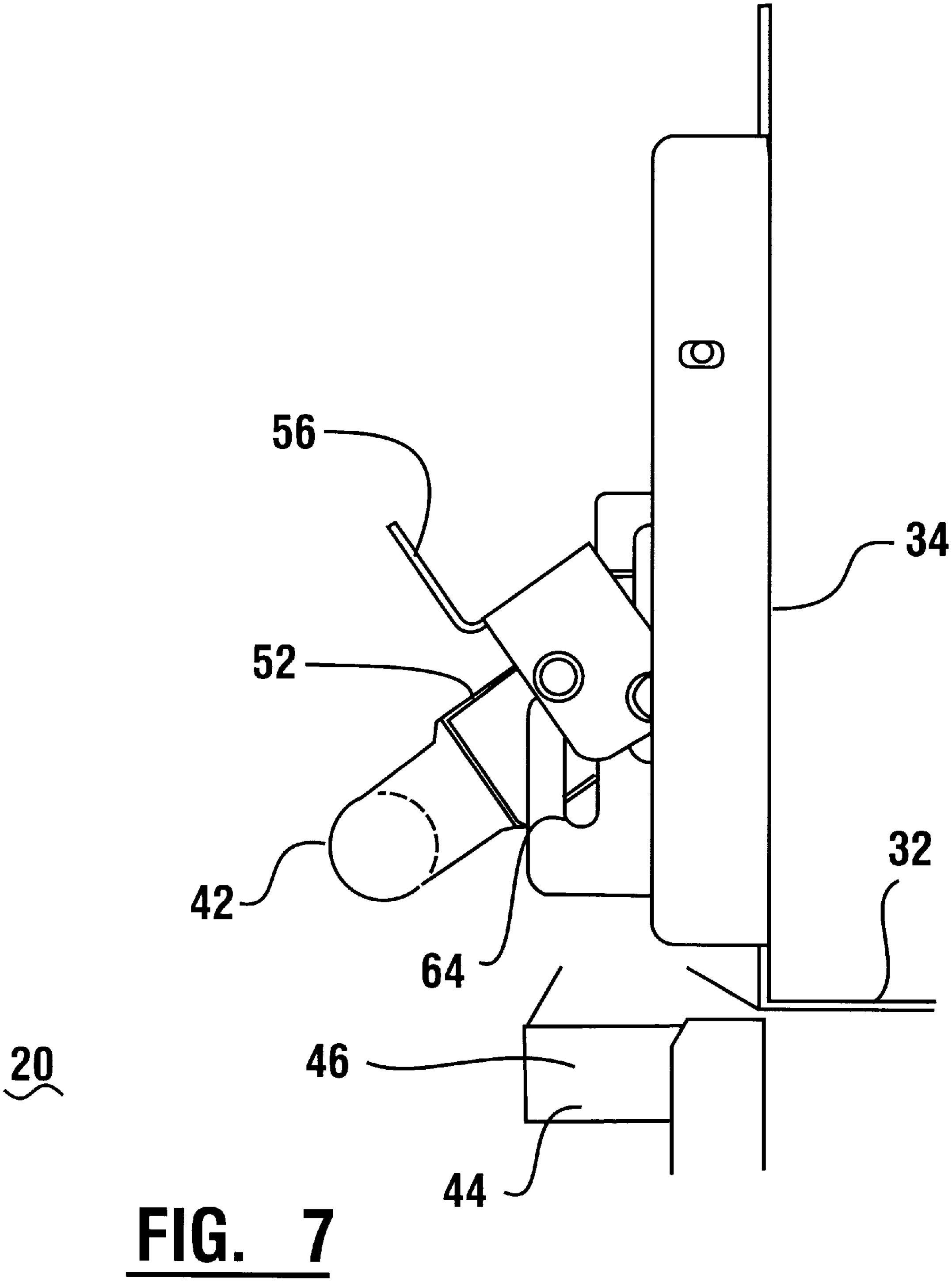
FIG. 7 is a left hand view of the light source shown in a position to illuminate the interior area of the enclosure.

As shown in FIG. 7 body 52 is supported on brackets 54. Front projections 58 extend in slots 62 while back projections 60 extend in slots 64. The orientation of projections 58 and 60 enable body 52 to be positioned as shown in FIG. 7. In this position the light source 42 illuminates the interior area 20. Servicing components in the interior area is greatly facilitated by the light which is provided by light source 42 in this position. In this position light source 42 is outside of pocket 44 of the light conducting passage 46. As a result the fascia is not significantly illuminated by the light source in this position.

Figure 8:
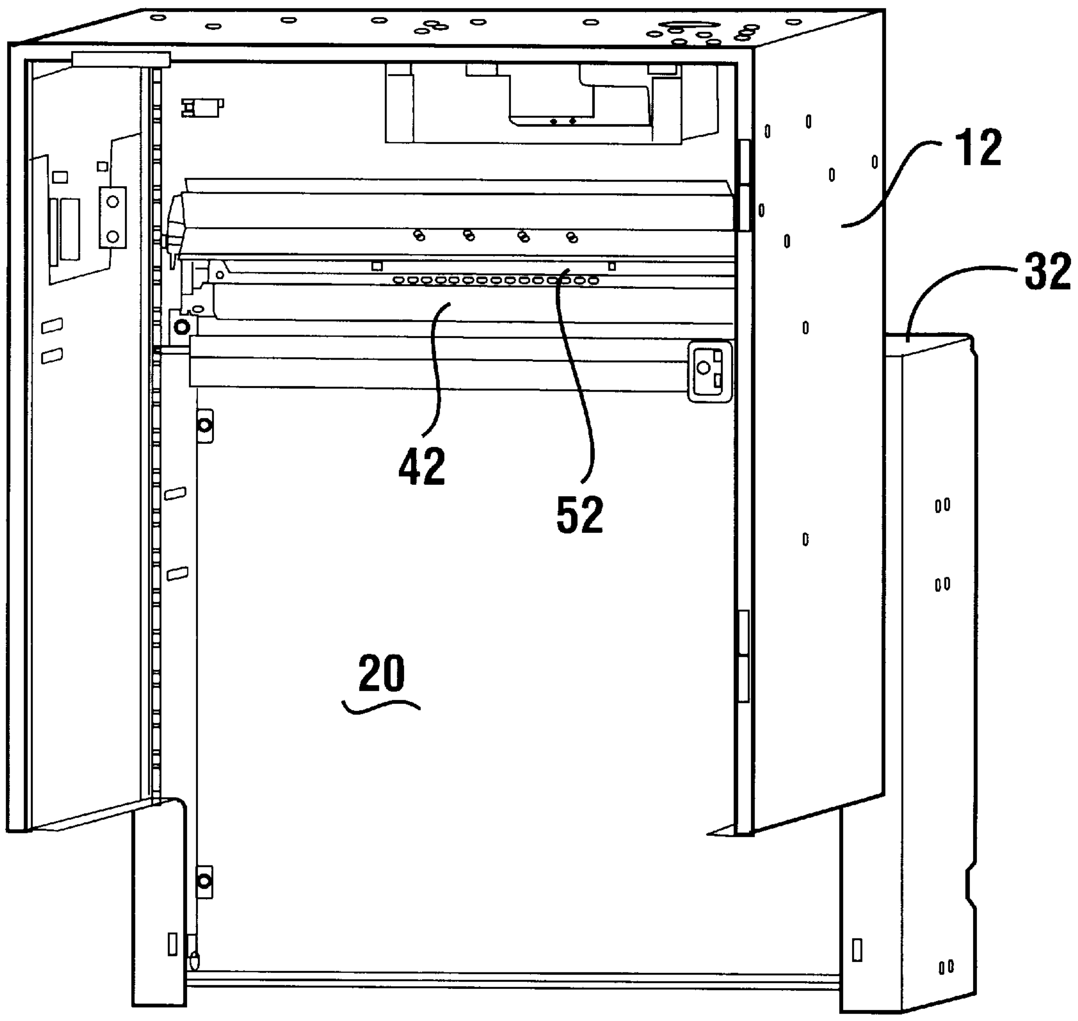
FIG. 8 is an isometric view showing the light source in a position comparable to that in FIG. 7.
Figure 9:
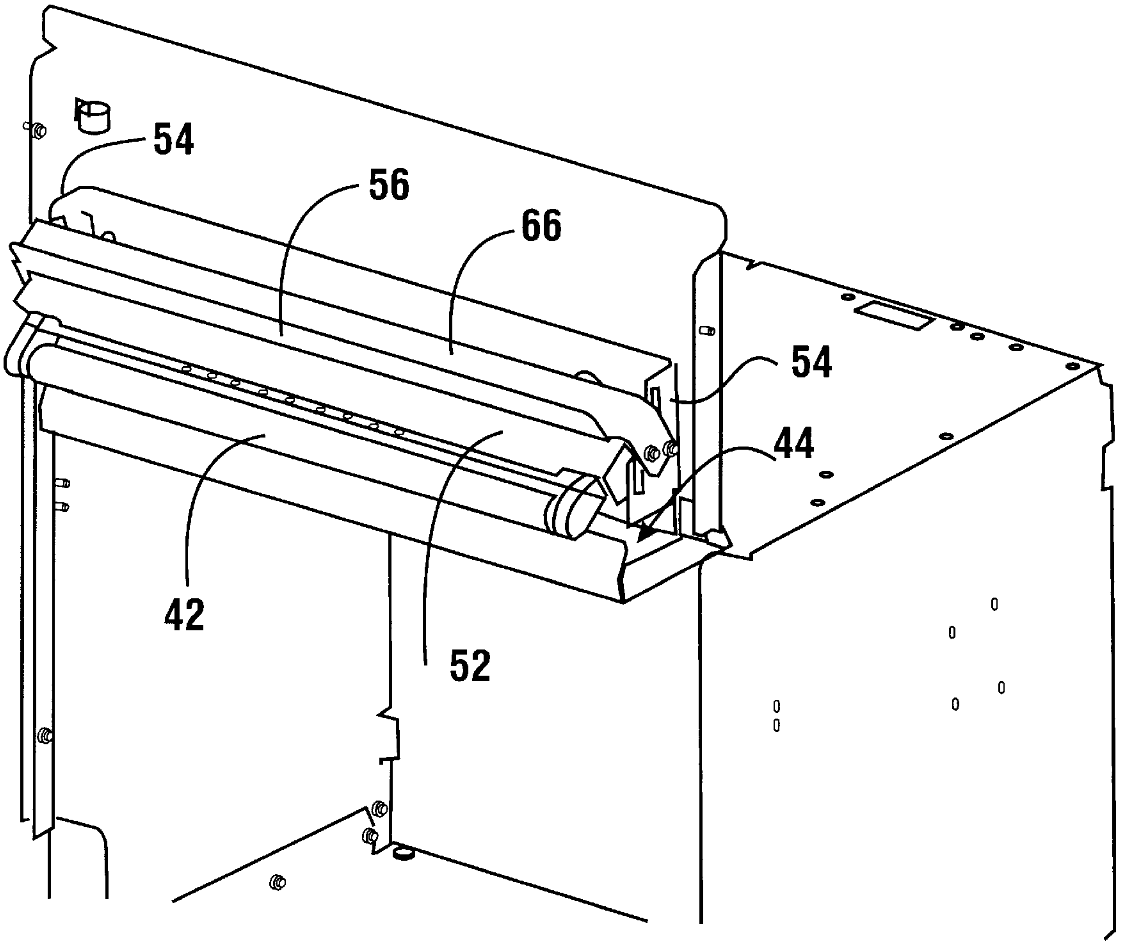
FIG. 9 is an isometric view showing the light source in a position similar to that shown in FIG. 7 with the light source being rotated out of the light conducting passage.

FIGS. 8 and 9 show the light source in the same position as in FIG. 7. As best shown in FIG. 9, handle 56 extends from a member 66 which spans body 52 of the light source. Projections 58 and 56 extend longitudinally intermediate between the ends of body 52 and member 66.

Figure 10:
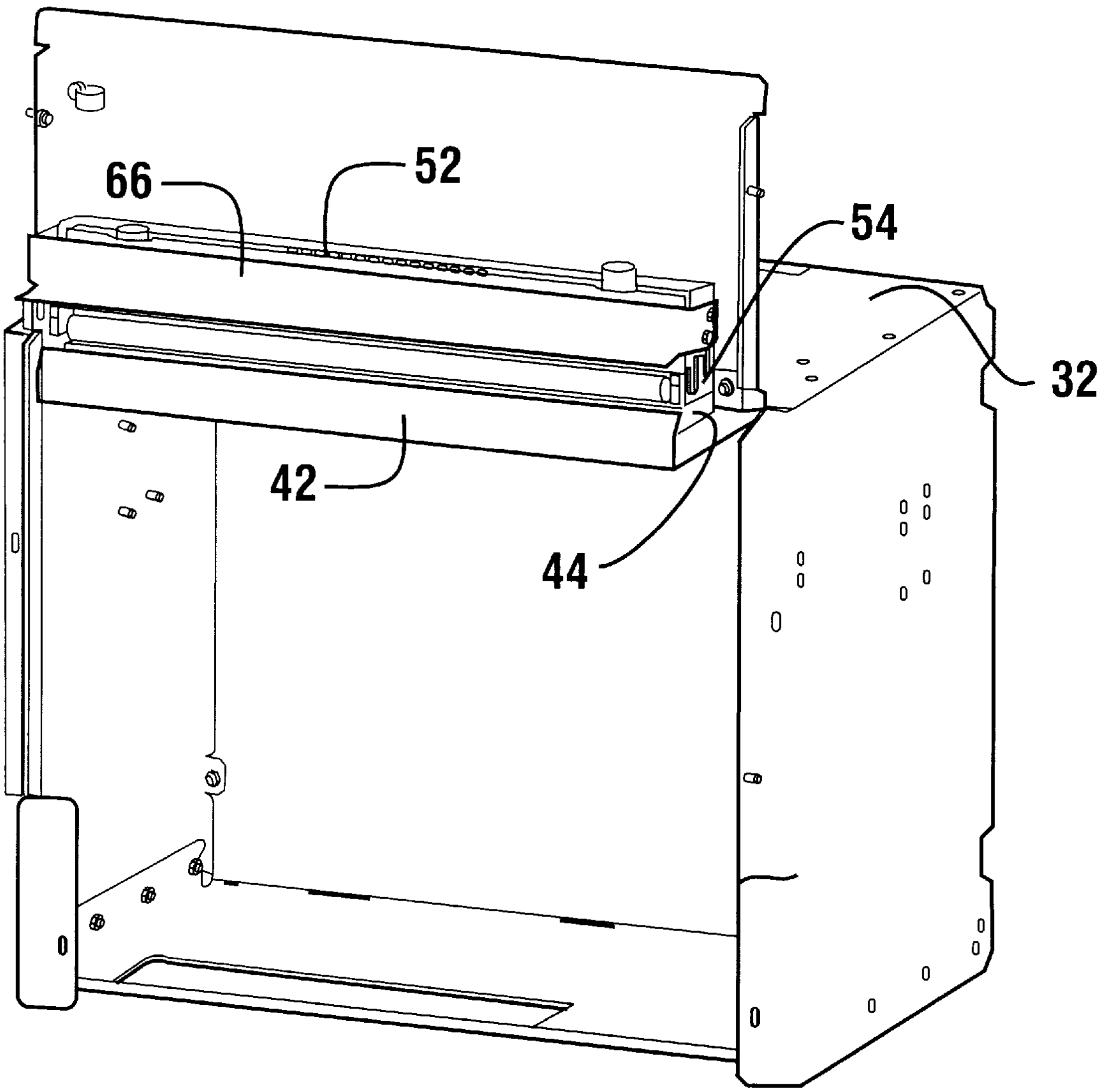
FIG. 10 is an isometric view similar to FIG. 9 but with the light source rotated into alignment with a pocket in the light conducting passage.

FIG. 10 shows the light source 42 rotated from the position shown in FIG. 9 so that the light source is vertically aligned with the pocket 44. In the position shown in FIG. 10 light source 42 is disposed vertically above the pocket and the light conducting passage. In this position the light source illuminates the interior area 20 of the enclosure and also illuminates the fascia to a greater degree than with the light source in the position shown in FIG. 9.

Figure 11:
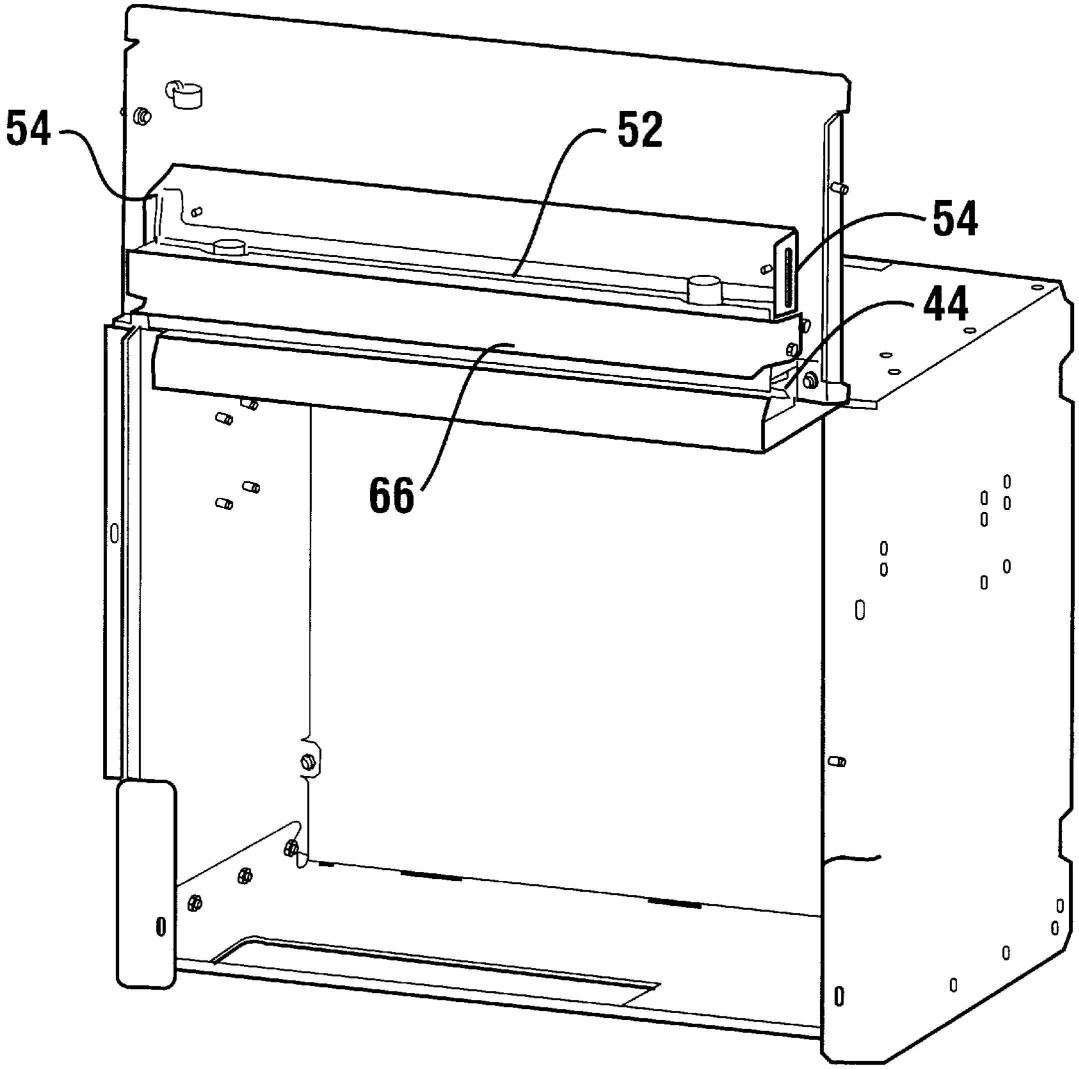
FIG. 11 is an isometric view similar to FIG. 10 with the light source moved vertically downward into the pocket in the light conducting passage.

In the position shown in FIG. 10 the front and back projections 58 and 60 are aligned with the slots 62 and 64 in brackets 54 respectively. This enables the light source 42 to be moved vertically downward into the pocket 44 as shown in FIG. 11. In this position light source 42 is positioned in the light conducting passage 46, which is the condition shown in FIG. 5. As a result the fascia and the user actuatable components thereon are fully illuminated.

As will be appreciated from the foregoing discussion, body 52 and the light source thereon include electrical contacts that are supplied with electrical energy from a cord or other movable connector. In the event the light source 42 should burn out it is a simple matter for a service person to vertically raise the body using handle 56. Once the body 52 is raised the light source may be rotated to facilitate changing the light source. Alternatively body 52 may be completely disengaged from brackets 54 to facilitate changing the light source. Body 52 may be provided with an electrical cord or other connector of sufficient length to enable the light source to be moved to an even more convenient location for changing the light source.

It should be understood that in the preferred embodiment enclosure 10 has a door on the end opposite to housing extension 32. A service person may access interior area 20 and the serviceable components therein by opening the door. In addition, a service person having gained access to the interior area may readily move light source 42 to illuminate either the fascia or the interior area.

Although the light conducting passage 46 extends in housing extension 32 in the preferred embodiment, the fascia 36 may be readily removed from housing extension 32 without disturbing the light conducting passage. When the fascia 36 is installed in the housing extension the end of the light conducting passage and the lens 48 are aligned to facilitate the transmission of light therethrough. It should be noted that the light conducting passage 46 includes a polished deflector surface 67 adjacent to lens 48. Deflector surface 67 like the other surfaces of passage 46, is highly reflective. The angle of deflector surface 67 directs light onto the face 50 of the fascia.

While in the preferred embodiment the light source is movable to either illuminate the interior area of the housing or the fascia, in other embodiments of the invention the light source may be stationary. In such alternative embodiments a movable member may be provided to selectively direct the light from the light source either onto the fascia or into the interior area of the machine. This may be accomplished in several ways including using a mirror-like reflective member to selectively direct the light. Of course alternative approaches may also be used within the scope of the invention.

While in the described embodiment light is conducted in a reflectorized light conducting passage, in other embodiments other types of light conducting devices may be used. Such light conducting devices may include any means suitable for directing light from the source to the point where illumination is required. Such devices may include conducting means such as fiberoptic materials, light conducting tubes, arrangements of mirrors and other items suitable for conducting light.

The preferred embodiment of the present invention provides significant advantages by enabling an ATM machine having an enhanced user interface to be installed in an existing wall opening. In addition it enables a service person to have more light in the interior area when they are servicing components therein.

Thus the preferred embodiment of the present invention achieves the above-stated objectives, eliminates difficulties encountered in the use of prior devices, systems and methods, and attains the desirable results described herein.

In the foregoing description certain terms have been used for brevity, clarity and understanding. However no unnecessary limitations are to be implied therefrom because such terms are used for descriptive purposes and are intended to be broadly construed. Moreover the foregoing descriptions and illustrations are by way of examples and the invention is not limited to the details shown or described.

In the following claims any feature described as a means for performing a function shall be construed as encompassing any means capable of performing the recited function and shall not be deemed limited to the means shown or described in the foregoing description as performing the recited function, or mere equivalents thereof.

Having described the features, discoveries and principles of the invention, the manner in which it is constructed and operated, and the new and useful results attained; the new and useful structures, devices, elements, arrangements, parts, combinations, systems, operations, methods and relationships are set forth in the appended claims.

We claim:

1. An automated banking machine apparatus comprising:

an enclosure, the enclosure having an interior area housing serviceable components of the machine;

a fascia, the fascia including user operable components, wherein the fascia is in operative connection with the enclosure;

a light source, wherein the light source is movably mounted in the enclosure, and wherein the light source is movable between a first position wherein the light source illuminates the fascia and a second position wherein the light source illuminates the interior area.

2. The apparatus according to claim 1 wherein the enclosure includes a light conducting passage, wherein the passage conducts light to illuminate the fascia and wherein in the first position the light source extends in the passage.

3. The apparatus according to claim 2 wherein the light conducting passage extends in an opening in a wall of the building.

4. The apparatus according to claim 2 wherein the light source is supported on a bracket, wherein the bracket enables selectively moving the light source in an upward direction out of the passage.

5. The apparatus according to claim 4 wherein the bracket enables rotating the light source after the light source has been moved out of the passage.

6. The apparatus according to claim 1 wherein the light source is an elongated light source and wherein the light source is supported on a pair of horizontally spaced brackets, and wherein the light source is movable while in supported connection with the brackets.

7. The apparatus according to claim 1 wherein the light source is an elongated light source, and wherein the light source is supported on a pair of horizontally spaced brackets, and wherein the light source is vertically movable while in supported connection with the brackets.

8. The apparatus according to claim 7 wherein the light source is rotationally movable in supported connection with the brackets after the light source is moved vertically a first distance.

9. The apparatus according to claim 8 and further comprising a light conducting passage wherein the light conducting passage conducts light to illuminate the fascia, and wherein the passage includes a pocket, and wherein the light source extends in the pocket in the first position, and wherein after the light source is moved the distance vertically the light source is enabled to be rotated.

10. The apparatus according to claim 7 wherein each of the brackets includes a vertically elongated slot.

11. The apparatus according to claim 10 wherein each bracket includes an L-shaped slot.

12. The machine according to claim 1 and further comprising a movable member in the enclosure, wherein movement movable member from a first position to a second position is operative to operatively disconnect the light source from the conducting means whereby the user actuatable components are no longer illuminated by the light source.

13. The apparatus according to claim 12 wherein movement of the movable member to the second position is operative to cause the light source to illuminate at least one of the serviceable components in the interior area.

14. An automated banking machine apparatus comprising:

an enclosure having an interior area housing serviceable components;

a housing extension extending through an opening in a building wall;

a fascia positioned in the housing extension;

a light source in the enclosure;

a light conducting passage extending from the enclosure to adjacent the fascia, wherein when the light source is in operative connection with the light conducting passage the fascia is illuminated.

15. The apparatus according to claim 14 wherein the light conducting passage is a reflective passage extending in the housing extension.

16. The apparatus according to claim 14 and further comprising a movable member wherein movement of the member directs light from the light source to the interior area.

17. An automated banking machine apparatus comprising:

an enclosure bounding an interior area housing serviceable components;

a fascia having user actuatable components, the fascia in operative connection with the enclosure;

a light source;

a movable member, wherein the movable member is movable between a first position wherein light from the light source is directed to illuminate the fascia, and a second position wherein light from the light source is directed to the interior area.

18. A method comprising the steps of:

installing a light source in connection with electrical contacts inside a housing of an automated banking machine;

moving the light source into a light conducting passage that conducts light to illuminate a fascia of the machine.

19. The method according to claim 18 wherein the moving step comprises moving the light source from a first position wherein the light source illuminates an interior area of the housing to a second position wherein the light source is within the light conducting passage.

20. A machine for conducting transactions comprising:

an enclosure bounding an interior area, wherein the interior area houses serviceable components of the machine;

a fascia of the machine having user actuatable components thereon, the fascia in operative connection with the enclosure;

a light source within the enclosure; and conducting means for conducting light from the light source in the machine to the fascia, wherein the light source is operative to illuminate the user actuatable components.

* * * * *